(12) United States Patent
Jojic et al.

(10) Patent No.: US 7,978,906 B2
(45) Date of Patent: Jul. 12, 2011

(54) CAPTURING LONG-RANGE CORRELATIONS IN PATCH MODELS

(75) Inventors: Nebojsa Jojic, Redmond, WA (US); Vincent Cheung, Toronto (CA)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 11/763,136

(22) Filed: Jun. 14, 2007

(65) Prior Publication Data

US 2008/0310755 A1 Dec. 18, 2008

(51) Int. Cl.
*G06K 9/62* (2006.01)

(52) U.S. Cl. .......................................... 382/159; 382/195

(58) Field of Classification Search ........................ None
See application file for complete search history.

(56) References Cited

U.S. PATENT DOCUMENTS

| | | | |
|---|---|---|---|
| 5,867,609 | A | 2/1999 | Shamoon et al. |
| 5,917,960 | A | 6/1999 | Sugawa |
| 6,259,803 | B1 | 7/2001 | Wirtz et al. |
| 6,373,994 | B1 | 4/2002 | Anderson |
| 6,385,340 | B1 | 5/2002 | Wilson |
| 6,738,532 | B1 | 5/2004 | Oldroyd |
| 7,082,224 | B2 | 7/2006 | Ikeda et al. |
| 2002/0181786 | A1* | 12/2002 | Stark et al. ..................... 382/225 |
| 2005/0135698 | A1 | 6/2005 | Yatsenko et al. |
| 2005/0232510 | A1 | 10/2005 | Blake et al. |
| 2006/0167692 | A1* | 7/2006 | Basu et al. ..................... 704/258 |
| 2006/0290950 | A1 | 12/2006 | Platt et al. |

OTHER PUBLICATIONS

Wexler, et al. "Space-Time Video Completion," Dept. of Computer Science and Applied Math, The Weizmann Institute of Science, http://www.wisdom.weizmann.ac.il/~irani/PAPERS/VideoCompletion.pdf, last viewed Mar. 6,2007, 8 pages, Rehovot, Israel.

Cheung, et al. "Video Epitomes," Proceedings of the IEEE Conference on Computer Vision and Pattern Recognition, http://www.psi.toronto.edu/pubs/2005/VideoEpitome-CVPR05.pdf, Jun. 2005, 8 pages, Los Alamitos, CA.

Zalesny, et al. "Multiview Texture Models," Swiss Federal Institute of Technology Zurich, http://www.vision.ee.ethz.ch/~zales/Public/CVPR2001.pdf, last viewed Mar. 6, 2007, 8 pages, Leuven, Belgium.

* cited by examiner

*Primary Examiner* — Brian P Werner

(74) *Attorney, Agent, or Firm* — Lee & Hayes, PLLC

(57) ABSTRACT

Systems and methodologies for modeling data in accordance with one or more embodiments disclosed herein are operable to receive input data, create data patches from the input data, obtain long-range correlations between the data patches, and model the input data as a patch model based at least in part on the data patches and the long-range correlations. Various learning algorithms are additionally provided for refining the patch model created in accordance with one or more embodiments disclosed herein. Further, systems and methodologies for synthesizing a patch model created in accordance with various aspects of the present invention with a set of test data to perform a transformation represented by the patch model on the test data are provided.

20 Claims, 13 Drawing Sheets

CAPTURING LONG-RANGE CORRELATIONS IN PATCH MODELS

TECHNICAL FIELD

The subject invention relates generally to creating patch models of data, and more particularly to systems and/or methods for capturing long-range correlations between data patches in patch models.

BACKGROUND OF THE INVENTION

Patch models create a representation of a category of input data by creating a set of patches that represent all of the constituent parts of the given category of input data. For example, a category of input data can be a particular kind of images, such as images of human faces. A significant advantage of patch models is that each constituent part of a category of data needs only one patch. Thus, because there will often be a large amount of repetition within the data in a category, a patch model can be much smaller than the data it is representing and still capture every aspect of the represented category of data.

Because of the benefits provided by patch models, the use of such models is increasing in popularity. Specifically, patch models for images have recently seen increased use for various low-level image processing tasks. These conventional image processing tasks use patch models to capture local correlations between pixels in a patch. Thus, if a patch in a first image matches well with a patch in a second image, then a second patch in the first image that shares pixels with the first patch should also match well to a similarly displaced second patch in the second image. Conventional image processing applications can use these local correlations to piece or cluster together groups of patches to form textures that can then be used to process portions of an image.

However, conventional patch models have difficulty in capturing longer-range correlations between more distant data elements in a set of data. Because of this, conventional patch models are not able to determine the overall context of a category of data on their own. For example, while a conventional patch model can represent small portions of an image based on local correlations between pixels within the image that are close together, the patch model cannot use these portions to create an entire image because it lacks the overall context of how the image is constructed. Thus, in applications that utilize these patch models, this context must be provided manually. Some conventional patch models have attempted to add some degree of context information by utilizing larger patches, but this approach is not fully effective. For example, larger patches are more difficult to match to data than smaller patches, which means that more patches are required to represent a category of data. Because using larger patches also requires the use of more patches, using larger patches can considerably increase the required size of a patch model. Additionally, patch models that utilize larger patches are still not able to capture the entire overall context of an image because, like patch models that utilize smaller patches, they can capture only local correlations between pixels within a patch.

Thus, in view of at least the above, there exists a need in the art for a patch model that is able to capture the entire overall context of a category of data without an undue sacrifice in size.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A patch model in accordance with embodiments disclosed herein can determine and utilize long-term correlations between data patches that do not necessarily share any common data elements. By determining long-range relationships between distant data patches, the patch model is able to obtain and utilize complete context information for a category of data with a relatively small patch and model size.

In accordance with one embodiment disclosed herein, the patch model can use this obtained context information to learn features of a set of data automatically from the data itself. For example, a patch model can be created from a set of images of cars. This patch model can obtain the overall context of these images and use this context to automatically learn the features that constitute a car. The model can thereafter be employed in image recognition using a generalized algorithm without requiring manual feature input from a user. In contrast, a conventional patch model would require a user to manually supply a prototypical image of a car and manually label the features of the prototypical image that constitute a car before the model can be employed for image recognition. Further, a custom-designed feature detection algorithm would be required to detect the specific features defined by the user.

In accordance with another embodiment disclosed herein, a patch model utilizing long-term correlations between data patches can be synthesized with data to automatically perform transformations on the data based on the model. As an example, a patch model created from video sequences of static objects that utilizes long-term correlations between patches can be synthesized with a still image of a like static object to create a simulated video sequence using the still image without any additional input required from a user.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
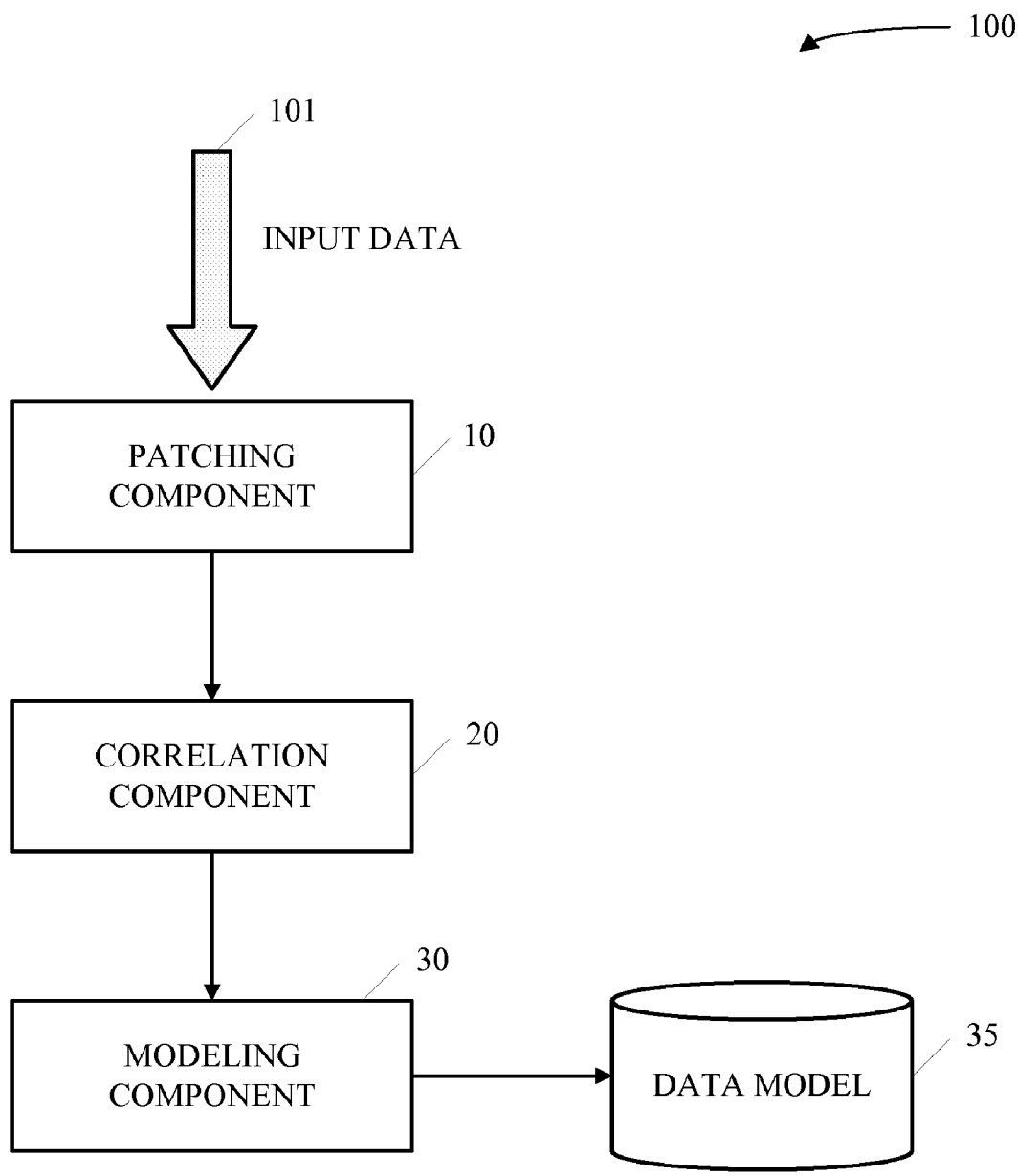
FIG. 1 is a block diagram of a system that facilitates modeling of data in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "algorithm," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. The components may communicate via local and/or remote processes such as in accordance with a signal having one or more data packets (e.g., data from one component interacting with another component in a local system, distributed system, and/or across a network such as the Internet with other systems via the signal).

Thus, the embodiments disclosed herein, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device.

The embodiments disclosed herein provide systems and/or methods for utilizing long-range correlations between patches in a patch model. These long-range correlations allow relations between patches that do not necessarily share common data elements to be learned. By doing so, the embodiments disclosed herein can utilize model constraints similar to those used for conventional elastic matching, wherein image pairs are registered by leveraging the fact that mappings are generally smooth between images to overcome erroneous correspondences due to noise or lack of identifying features. These model constraints can then be used to model the mappings of each patch within a set of data to a common learned representation of a category of data. Thus, the full probability distribution of the data can be captured, making it possible to utilize long-range correlations between data patches in various inference tasks. By way of example and not limitation, these inference tasks can include data registration, data likelihood computation for tasks such as classification or detection, and missing data interpolation.

Further, it should be appreciated that while some of the embodiments disclosed herein are generally described in the context of modeling two-dimensional image data and/or three-dimensional video sequence data (wherein two dimensions represent the spatial dimensions of each individual frame in a video sequence and an additional third dimension represents time), those skilled in the art will recognize that the embodiments disclosed herein can be applied to any type of data, having any number of dimensions, for which a patch model could be utilized. It is to be appreciated that the systems and/or methods disclosed herein can be applied to any suitable type of data having any suitable number of dimensions and all such applications are intended to fall within the scope of the hereto appended claims.

Referring now to the drawings, FIG. 1 illustrates a block diagram of a system 100 that facilitates modeling of input data 101 in accordance with an aspect of the present invention. In accordance with one embodiment, input data 101 that is sent to the system 100 is initially processed by a patching component 10. When the patching component 10 receives the input data 101, it creates a set of data patches from the input data 101.

In accordance with one aspect of the embodiments disclosed herein, the data patches created by the patching component 10 from the input data 101 can be of a uniform size and shape. By way of a non-limiting example, if the patching component 10 receives input data 101 in the form of an image, the patching component 10 can create a set of rectangular data patches from the image having a uniform size. In one example, the size of the data patches can be predetermined by a user of the system 100. The set of data patches can be constructed in various ways by the patching component 10 in accordance with various embodiments. Additionally, data patches within the set can share overlapping data. In one example, the set of patches can include all of the possible patches of a specified size and shape, including overlapping data patches, within the input data 101.

Once the patching component 10 creates a set of data patches corresponding to the input data 101, a correlation component 20 can obtain long-range correlations between those data patches. In accordance with one embodiment, the correlation component 20 determines long-range correlations between pairs of data patches received from the patching component 10.

In one example, the correlation component 20 can obtain long-range correlations between the given data patches by selecting a representative sample of the possible patch pairs to analyze. This example lends itself particularly well to data patches representing image data and other forms of data that exhibit a large degree of smoothness. Because of the smoothness exhibited by the data, it can be inferred that any patches that are close to chosen patches will have long-range correlations that are similar to the chosen patches. Thus, long-range correlations for patches that are close to the chosen patches can be estimated from the long-range correlations obtained for the chosen patches. The representative sample of patch pairs can be selected according to a predefined selection pattern. In alternative examples, this selection pattern can conform to a pre-specified configuration or it can be randomly created.

In accordance with one embodiment, the long-range correlations determined by the correlation component 20 can be made adaptive to account for changes in relative feature position and scalar changes to individual data elements in the input data 101. By way of a non-limiting example, for input data 101 in the form of images, the long-range correlations determined by the correlation component 20 can adapt to changes in position of a subject between images and changes in contrast of a particular pixel between images. Thus, the system 100 can still construct a data model from images that accurately depicts the class of images despite changes or deformities present in some of the images.

The system 100 further includes a modeling component 30, which takes the data patches created from the input data 101 by the patching component 10 and the long-range correlations obtained from the data patches by the correlation component 20 and creates a data model 35 of the input data 101. As a specific, non-limiting example, a modeling component 30 within a system 100 that receives images as input data 101 can create a data model 35 in the form of an epitome model that serves as a common representation for a category of images.

In one example, the modeling component 30 can employ learning algorithms to improve the data model 35 created by the modeling component 30. For example, based on input data 101 supplied by a user, the system 100 can model the input data 101 as a data model 35 via the modeling component 30. Thereafter, a user can supply additional input data 101 to the system 100 that is in the same category of data as the original input data 101. Based on the existing data model 35 and the new input data 101, the modeling component 30 can refine the data model 35 to better represent the category of data. Thus, the modeling component 30 can learn the features that constitute a category of data and the proper correlations between those features over time.

As a non-limiting example, the system 100 can receive input data 101 corresponding to an image of a house. Based on data patches provided by the patching component 10 and long-range correlations between those data patches provided by the correlation component 20, the modeling component 30 can create a data model 35 that represents the category of data (i.e., images of houses) from the image received as input data 101. If a second image of a house is then provided as input data 101 to the system 100, the modeling component 30 can use this second image in conjunction with its corresponding data patches and long-range correlations to modify the data model 35 to better represent images of houses. As can be appreciated, each successive image of a house provided as input data 101 to the system 100 would allow the modeling component 30 to further refine the data model 35.

Figure 2:
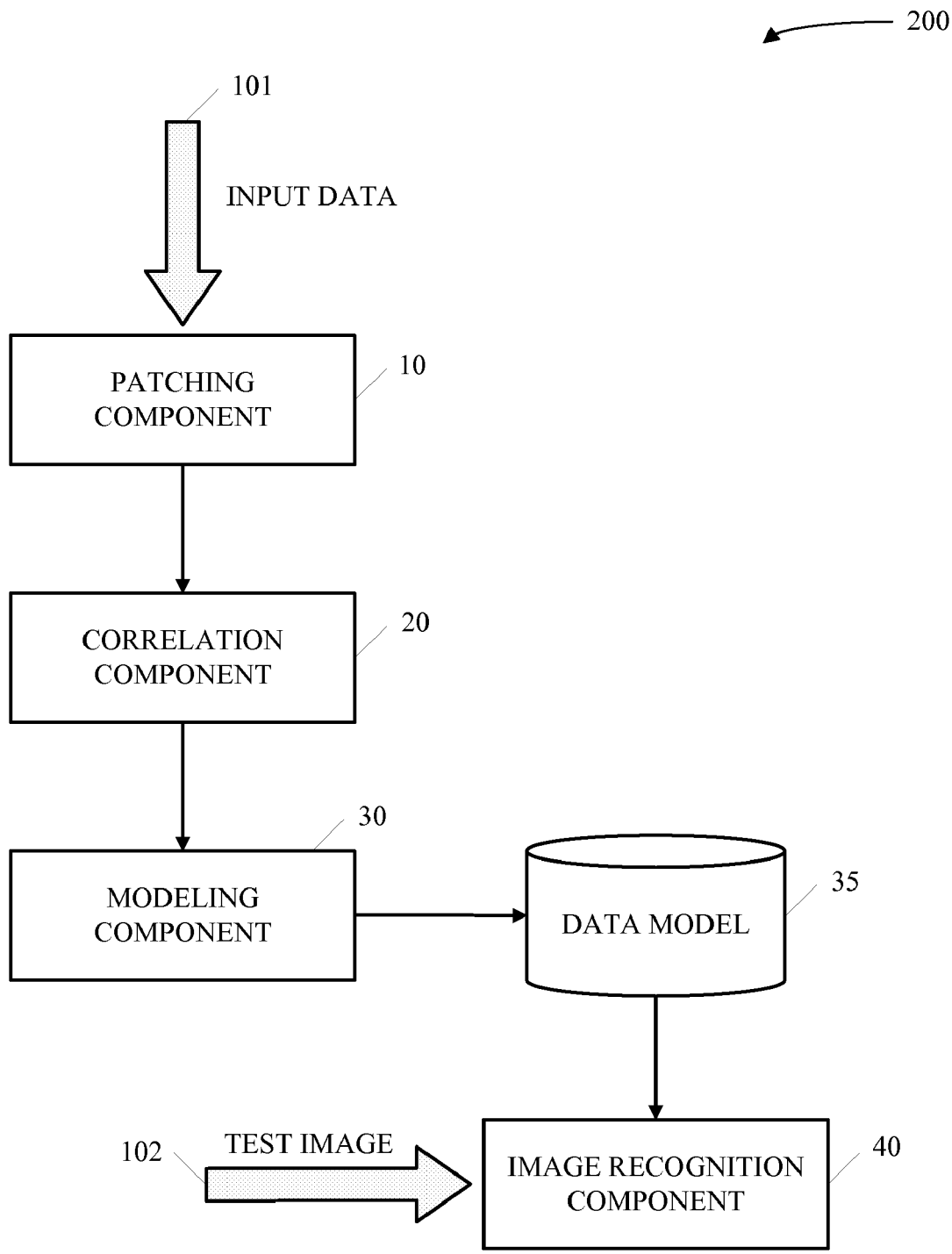
FIG. 2 is a block diagram of a system that facilitates modeling of data in the context of an image recognition application in accordance with an aspect of the present invention.

Referring now to FIG. 2, a block diagram of a system 200 that facilitates modeling of input data 101 in the context of an image recognition application in accordance with an aspect of the present invention is illustrated. The system 200 contains a patching component 10 that creates data patches from input data 101, a correlation component 20 that determines long-range correlations between those data patches, and a modeling component 30 that takes the data patches created from the input data 101 by the patching component 10 and the long-range correlations obtained from the data patches by the correlation component 20 and creates a data model 35 of the input data 101. In accordance with one embodiment, the data model 35 can then further be provided to an image recognition component 40. The image recognition component 40 can then use the data model 35 to determine whether and to what extent a test image 102 provided to the image recognition component 40 matches a category of images represented by the data model 35.

In accordance with one embodiment, the data model 35 is capable of rich representation of the features that make up a category of images and the correlations between those features. From this rich representation of features and the correlations between them, the image recognition component 40 can derive image processing and recognition rules from the data model 35. For example, a data model 35 that represents images of front views of houses could illustrate that the features that constitute a house include a roof, a front door, and a series of steps leading up to the front door. The data model 35 could also illustrate the correlations between these features. For example, the roof should be on the top of the house above the front door and the steps, the front door should be located below the roof at about the bottom of the house, and the steps should be located directly below the front door. From these features and correlations illustrated by the data model 35, the image recognition component 40 can derive rules dictating that an image of a front view of a house should contain the given features in approximately the given relative positions. The image recognition component 40 can then determine whether and to what extent a test image 102 matches the representation given by the data model 35 by determining whether any features that correspond to the data model 35 exist in the test image 102 and comparing the relative positions of these features to the correlations given by the data model 35.

Figure 3:
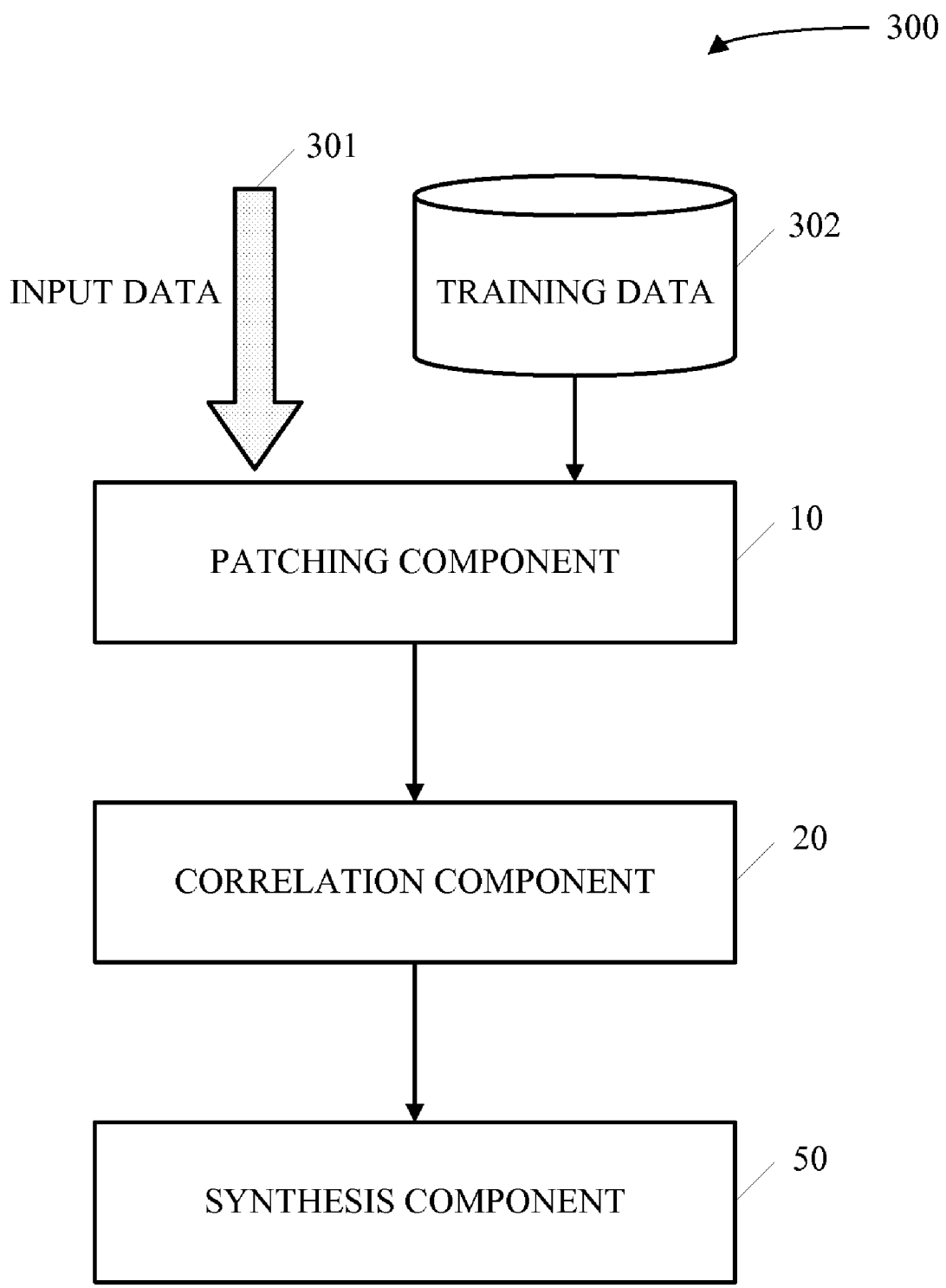
FIG. 3 is a block diagram of a system that facilitates the synthesis of input data with a set of training data in accordance with an aspect of the present invention.

Referring to FIG. 3, a block diagram of a system that facilitates the synthesis of input data with a set of training data in accordance with an aspect of the present invention is illustrated. In accordance with one embodiment, input data 301 can be synthesized with training data 302 to perform a transformation on the input data 301 that is reflected in the training data 302. As a non-limiting example, the training data 302 can include one or more video sequences of an object under various changes in lighting and the input data 301 can consist of a still image of a similar object. The system 300 can synthesize the input data 301 with the training data 302 to create a video sequence from the still image provided as input data 301 that recreates the lighting changes provided by the video in the training data 302.

When the input data 301 and the training data 302 are received by the system 300, they are processed by a patching component 10. The patching component creates a set of data patches for each set of data and communicates these patches to a correlation component 20, where long-range correlations between the data patches obtained from the respective sets of data are determined.

The data patches created from each set of data and the long-range correlations obtained therefrom are then received by a synthesis component 50, which synthesizes the input data 301 with the training data 302. In one example, the synthesis component 50 can create a representation of the training data 302 that reflects the object or category of objects provided by the training data 302 as well as any transformations performed on the object or category of objects in the training data 302. This representation can be created at least in part from the data patches created from the training data 302 by the patching component 10 and the long-range correlations obtained from those data patches by the correlation component 20. Further, this representation can be a patch-level representation, or a lower-level representation that can represent an object and any relevant transformations to the object in terms of individual data elements. As a non-limiting example, if the training data 302 consists of images or video sequences, a patch-level representation or a pixel-level representation can be created.

In one example, the synthesis component 50 can then use its representation of the training data 302 to perform a transformation on the input data 301. If the training data 302 is of a higher dimensionality than the input data 301, the synthesis component can handle the input data 301 as a cross-sectional slice of higher-dimensional data wherein all but the cross-section given by the input data 301 is missing. The synthesis component 50 can then interpolate higher-dimensional data for the given input data 301 by utilizing its representation of the training data 302 and satisfying constraints defined by the long-range correlations between data patches of the input data 301 and the training data 302 as given by the correlation component 20. For example, the training data 302 can include three-dimensional data in the form of one or more video sequences (which can be viewed as having two spatial dimensions plus an additional dimension in time). Thus, if the input data 301 consists of a single two-dimensional still image, the synthesis component 50 can process the still image as a frame from a video sequence where all but the given frame are missing. The synthesis component 50 can then interpolate the remaining frames of this video sequence based on the still image given as input data 301 and its representation of the one or more video sequences given as training data 302.

In various embodiments disclosed herein, the synthesis component 50 creates a representation of the training data 302 from data patches obtained by the patching component 10 and long-range correlations between the data patches determined by the correlation component 20. The components of the system 300 are operable to represent a set of training data 302 using generalized algorithms without requiring manual customization for different categories of objects or types of transformations. For example, the system 300 can be used to simulate illumination changes on an object. In such an application, the training data 302 can be a video sequence of an object that illustrates the desired illumination changes and the input data 301 can be a still image of a similar object.

Conventionally, similar image relighting tasks require an expensive, brute force hardware approach wherein numerous photos must be taken of the subject image from various angles, which must then be pieced together to create a desired illumination change. This conventional approach has several limitations. For example, a priori knowledge of the desired illumination change is required; thus, the conventional hardware approach cannot be used to change the illumination of subjects such as deceased individuals. Additionally, the conventional hardware approach can only be utilized for subjects that are capable of remaining still and are tolerant to strobe lights. Further, a subject to be re-lit using the conventional hardware approach must be capable of fitting in a small domed structure, meaning that entire scenes cannot be re-lit using such an approach.

Alternatively, for specific categories of objects such as human faces, illumination changes have conventionally been simulated using surface geometry and reflectance models that are specifically constructed for the given category of objects. Thus, each category of objects for which illumination changes are desired requires the construction of an object-specific surface model. If the category of objects is sufficiently complex, such as when illumination changes are desired for pictures of animals, pieces of cloth, or even entire scenes, the construction of an object-specific surface model for the category becomes prohibitively difficult.

Because the embodiments disclosed herein work with generalized, example-based algorithms, the need for specialized construction or modeling is eliminated. Further, the generalized algorithms used by the embodiments disclosed herein allow for more complicated types of data transformations than those that are possible under conventional approaches. For example, the embodiments disclosed herein can simulate a walk through a hallway given only a still image of the hallway using the same generalized algorithms that can be used to simulate illumination changes on an object.

Figure 4:
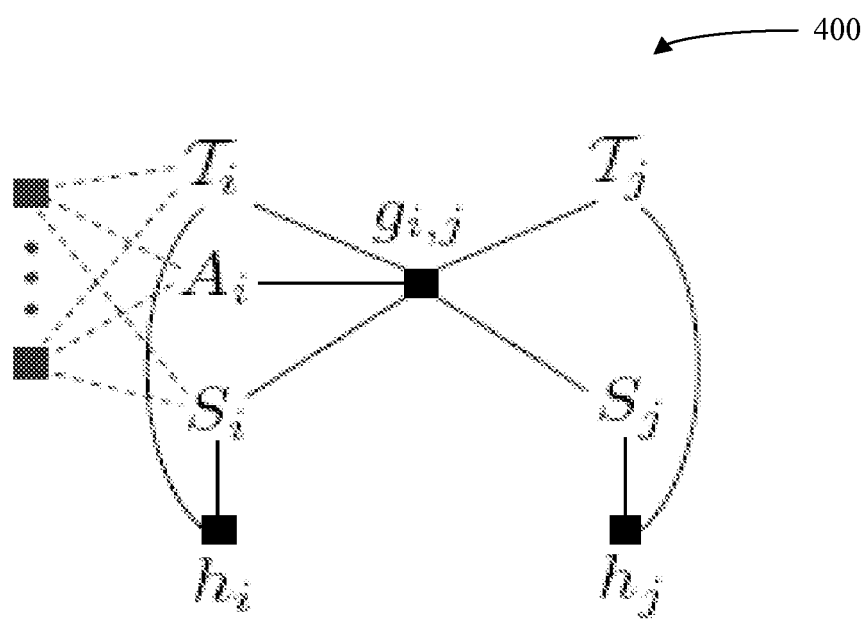
FIG. 4 is a graph illustrating a mapping between input data patches and locations within a patch model in accordance with an aspect of the present invention.

Referring now to FIG. 4, a graph 400 illustrating a mapping between input data patches $S_i$ and $S_j$ and locations $T_i$ and $T_j$ within an epitome model in accordance with an aspect of the present invention is provided. The following discussion sets forth various algorithms that can be used for the creation of a data model (e.g., data model 35) in the form of an epitome model for two-dimensional image data (e.g., input data 101) based at least in part on the mapping illustrated by graph 400 in accordance with various aspects of the present invention. While the following algorithms are described in the context of modeling images, this context is provided as an example and not as a limitation. Thus, it should be appreciated that any suitable type of data having any number of dimensions can be modeled in accordance with various embodiments of the present invention and that all such types of data are intended to fall within the scope of the hereto appended claims.

1. Epitome Models

An epitome model is a form of data model that can be used for modeling images. Under an epitome model for images, a set S contains the indices of pixels from an image z. The set S, defined by $z_S = \{z_u | u \in S\}$ where the boldface index u represents a set of two-dimensional index coordinates (i.e., x-y coordinates), can be described by specific individual probability distributions taken from a set T containing locations within an epitome e as follows:

$$p(z_S | e_T) = \prod_k p(z_{S(k)} | e_{T(k)}) \qquad (1)$$

These probability distributions can be simplified as follows:

$$p(z_S | e_T) = \prod_k e_{T(k)}(z_{S(k)}) \qquad (2)$$

In Equations (1) and (2), it can be assumed that the sets S and T are ordered and of equal sizes and that the kth index in one set corresponds to the kth index in the other. Given a number of correspondences between different subsets of pixels in training images $S_i$ and subsets of epitome locations $T_i$, learning an optimal epitome can reduce to assembling sufficient required statistics. For example, if the distributions at each epitome location $e_u$ are Gaussians such that $p(z_v | e_u) = e_u(z_v) = N(z_v; \mu_u, \sigma_u^2)$ for two-dimensional indices u and v and image z, then the mean $\mu_u$ of the Gaussian at epitome location $e_u$ will be equal to the average of all the pixels from image z that map at that location, which can be computed as follows:

$$\mu_u = \frac{\sum_i \sum_k [u = T_i(k)] z_{S_i(k)}}{\sum_i \sum_k [u = T_i(k)]} \quad (3)$$

If the correspondences between different subsets of pixels in training images $S_i$ and subsets of epitome locations $T_i$ are not given, the nature of the correspondences can instead be described so as to limit the possibilities of particular correspondences. For example, one way to limit the space of allowed correspondence is to consider subsets $S_i$ in the data as rectangular patches of a certain size such that $S_i = \{u = (x, y) | X_i \leq x < X_i + \delta, Y_i \leq y < Y_i + \delta\}$, and to also consider the corresponding epitome subsets $T_i$ as rectangular patches starting at some epitome location $X_j, Y_j$. In doing so, the mapping for each set S can be inferred using an early estimate of the epitome. This leads to soft posterior mapping of image subsets $S_i$ to the corresponding epitome subsets $T_i$, which can be expressed as:

$$q(T_i = T) = p(T_i = T | S_i, z) \propto p(z_{S_i} | e_T) p(T), \quad (4)$$

where p(T) is the a priori probability that epitome patch T is used to describe any of the data. The posterior distribution is then established by normalizing Equation (4) over all possible sets T.

Once the soft posterior mapping of Equation (4) is computed, the epitome can then be re-estimated using the soft mapping. In an example utilizing Gaussian epitome entries, the means of the epitome entries can be estimated as a weighted average of all pixels within an image z, with the weights defined by mapping probabilities. Since each set of image coordinates $S_i$ may map to any set of epitome coordinates T with probability $q(T_i = T)$, the statistics required by the epitome model can reflect this fact by weighting these probabilities as follows:

$$\mu_u = \frac{\sum_i \sum_T q(T_i = T) \sum_k [u = T(k)] z_{S_i(k)}}{\sum_i \sum_T q(T_i = T) \sum_k [u = T(k)]}. \quad (5)$$

While not shown, the variance $\sigma_u^2$ at each location can be estimated in a similar fashion.

By iterating mapping inference and epitome re-estimation, joint epitome learning and data registration can be achieved. The learning procedure can quilt and average patches from various locations from one or more images to create a compact model of all patches. As one of ordinary skill in the art can appreciate, epitome models can also be used for other types ordered data having the same or different dimensionalities. For example, three-dimensional epitome models have been used to model video sequences, and one-dimensional epitome models have been used to model sound recordings and vaccines. Similarly, the embodiments disclosed herein can be applied to these and other appropriate forms of ordered data having any number of dimensions.

Traditionally, particular applications of epitome models for images consider regular small patches of image pixels to form various sets $S_i$. Further, the same size patches are used in the epitome model. Thus, the search for optimal mapping of each image patch is linear in the size of the epitome model, as effectively, only the position of the epitome patch is required to fully describe the mapping regardless of the patch size. However, traditional applications of epitome models limited the spatial extent in which image correlations can be captured by the epitome to individual patches. Due to overlap between patches in the input images and the epitome model, textures that are larger than the patch sizes can form in the epitome model. However, because of the limitations placed on the spatial extent of image correlations, the textures formed are often much smaller than the object size.

In contrast, the basic formulation of the model utilized by various embodiments disclosed herein allows the pixel coordinates in $S_i$ to come from disconnected parts of the image. Further, the mapping rules that limit the space of possible sets of epitome coordinates T can include rotation, shearing and other transformations. This allows the model to capture more complex geometric changes that span a larger spatial extent in the image than what was possible in traditional applications. Traditionally, while the inclusion of more sophisticated geometric transformations has been studied, the use of non-contiguous patches has not been investigated due to the potential explosion in the numbers of possible image subsets $S_i$ that must be considered in such an application. Some traditional approaches utilize patches of arbitrary and inferred shape in epitome structures, but these patches are still contiguous and therefore cannot capture global correlations in images. For an epitome model of images, video sequences, or any other form of ordered data, the epitome model cannot capture the global aspects of the objects that are used to train the model without directly capturing longer-range correlations in data.

In view of at least the above, instead of using non-contiguous patches to capture the correlations in distant parts of a set of data within each single mapping S→T as suggested by previous approaches, various embodiments disclosed herein can model correlations among different mappings $S_i \rightarrow T_i$. This allows the embodiments disclosed herein to capture long-range correlations in a set of data while still having relatively simple individual patches and mappings.

2. The Mapping Field

In accordance with one embodiment, simple rectangular patches are used to represent input data. The use of simple rectangular patches to represent data has significant computational advantages. These advantages are especially significant for higher dimensional data. Further, rectangular patches allow the use of fast Fourier transforms and other efficient image correlation computations that are necessary to efficiently perform otherwise very expensive computations. In alternative examples, smaller patches of other shapes can be simulated by using masking variables in conjunction with the rectangular patches or by using jigsaw models. Using jigsaw models incurs a higher computational cost than using masking variables, although jigsaw models offer some other benefits that could make them more suitable to particular applications of the embodiments disclosed herein.

In accordance with one aspect of the present invention, different patches of data having coordinates $S_i$ are mapped to associated epitome coordinates $T_i$. Traditional applications of epitome models assumed the independence of variables $T_i$ because the patch overlap naturally enforced the appropriate agreements in mappings of nearby patches. In contrast, various embodiments disclosed herein can capture the constraints on the mappings to $T_i$ and $T_j$ from distant patches $S_i$ and $S_j$ through agreement factors $g_{i,j} = g(T_i, T_j, S_i, S_j)$, as illustrated in the graph 400. In one example, these agreement factors will have a high value if the mappings $T_i$ and $T_j$ keep the geometric configuration of patches $S_i, S_j$ that come from a single image. The factors $h_i$ illustrated by the graph 400 correspond to epitome likelihoods, such that, for example, $h_i = e_{T_i}(S_i)$. Thus, the likelihood of the entire image is proportional to the product of all factors. This can be computed as follows:

$$p(z_{S_1}, z_{S_2}, \ldots, z_{S_I}) \propto \prod_i h_i \prod_{j \in N_i} g_{i,j} \qquad (6)$$

where I is the total number of image patches considered and $N_i$ represents the set of data patches j connected to patch i in the model. It should be appreciated that, for the sake of brevity, only some of the factors that are used in Equation (6) are illustrated by the graph 400. Further, the set $N_i$ can either be arbitrary for each patch i or based on a particular relative configuration used for all patches in the image. If a particular relative configuration is used, it can be pre-arranged or randomly selected.

In one example, the agreement factors g illustrated in the graph 400 are chosen to enforce the property that the relative positions of the coordinates in $S_i$, $S_j$ are preserved in the mappings $T_i$, $T_j$, such that $S_i(k)-S_j(k) \approx T_i(k)-T_j(k)$. If each patch is kept rectangular, this is equivalent to $\bar{S}_i - \bar{S}_j \approx \bar{T}_i - \bar{T}_j$, where the bar denotes taking the mean of the coordinates in the set, since $S_i(k)-S_j(k)$ is constant for all elements and the same is true for $\Delta T$. Alternatively, this property could be enforced by merging the patches $S_i$ and $S_j$ into one non-contiguous patch S and imposing constraints on the epitome mapping T. However, this could cause the patches in the epitome to become non-uniform in shape, which would make it impossible to use cumulative sum and other computations to perform efficient computation of the patch likelihoods $h_i$ for all possible patches $T_i$.

If the mapping inference enforces a preference to keeping the relative positions of the chosen patches, it is possible for an epitome model to reflect longer-range correlations in images. However, images often undergo geometric deformations due to angle of view changes and object deformations, which can violate some of these constraints. To account for this, the agreement factors g illustrated in the graph 400 can allow for different variances on the Gaussians that enforce them, such that $g_{i,j} = N(T_i - T_j; \bar{S}_i - \bar{S}_j, \Phi_{i,j})$. In this way, we the mappings $S_j \rightarrow T_j$ for the neighbors of $S_i$, i.e., $j \in N_i$ can affect the mapping $S_i \rightarrow T_i$.

In one example, the neighborhood $N_i$ can consist of K patch indices. It should be appreciated that there can be roughly as many different rectangular patches as there are pixels in an image, since a patch can be centered at any pixel except those close to an image boundary. Thus, in one example, these patches can be indexed by their central pixels. In another example, a neighborhood is chosen for each patch $S_i$, where i represents a two-dimensional coordinate of the central pixel (e.g., an x-y coordinate), by first choosing K random two-dimensional offsets $\Delta_k$ up to some maximal distance d, such that $d \geq \|\Delta_k\|$ for all k, and then defining $N_i$ as an ordered set with patch indices $N_i(k) = i + \Delta_k$. By way of a non-limiting example, the distance d can be a fractional portion of the image size, such as half or quarter of the image size. Thus, to construct the field of mapping constraints, each patch i can be connected to interacting neighbors in the same relative configuration. However, due to the uncertainty captured in the two-dimensional covariance matrix $\Phi_{i,j}$ in the Gaussians $g_{i,j}$, the mapped epitome patches $T_j$, $j \in N_i$ may not follow fixed configurations.

In the above example, the K Gaussians $g_1$, for a given i should have linked parameters, since they should all depend on the local deformation at i. Additionally, because of possible compression of the texture in the epitome model and because of local image foreshortening and object deformations due to viewing angle changes and other effects, the epitome model can be made more flexible by introducing a hidden transformation $A_i$ as illustrated in graph 400 that affects each of the patch links, such as the factors $g_{i,j}$, as follows:

$$g_{i,j} = N(T_i - T_j; A_i(\bar{S}_i - \bar{S}_j), \Phi_{i,j}). \qquad (7)$$

In one example, the transformation given by Equation (7) is linear and $A_i$ is a matrix. Additionally, the prior on the matrix $A_i$ (not shown in graph 400) can be included so as to prefer identity. When each patch is connected to a large number of interacting neighbors, such as when $N_i$ contains a sufficiently large number of patches, $A_i$ is inferable. In another example, parameters $\Phi_{i,j}$ can be linked for different patches for different patches as follows:

$$\Phi_{m,N_m(k)} = \Phi_{n,N_n(k)} = \Phi_k. \qquad (8)$$

By doing so, links in the same relative configuration (e.g. links that share the same offsets $\Delta_k$) can share the same covariance structure. This allows the relative extent of the image correlations to be learned. For example, the links that tend to lead to low correlation (e.g., because they reach too far in some direction) will have high variance captured in $\Phi_k$.

Additionally, image intensity changes (e.g. darkening or brightening of the patches) can be taken into account in the factors $h_i$ as illustrated in the graph 400 by adding two scalar hidden variables a and b that control patch contrast as follows:

$$h_i = e_{T_i}(a_i z_{S_i} + b_i) \qquad (9)$$

3. Mapping Inference

Once all of the factors illustrated by the graph 400 are defined for the long-range patch correlations provided by Equations (6) through (9), mapping relationships between patches obtained from input data (e.g., input data 101) and patch locations in an epitome model (e.g., data model 35) can be inferred. In one embodiment, the epitome model is a Markov random field (MRF), although the epitome model differs from that used in conventional vision applications because it contains more frequent and further-reaching links, with the epitome model as the representation of the observation likelihoods. In one example, inference in the epitome model is achieved via a variational technique. It should be appreciated, however, that a number of techniques for inference in MRFs can be adapted to the present invention, including sampling, loopy belief propagation, and variational techniques, and all such inference techniques are intended to fall within the scope of the hereto appended claims.

In accordance with the above example, a simple variational technique is employed to factorize the posterior distribution as $Q = \Pi_i q(A_i) q(a_i, b_i | T_i) q(T_i)$. Under this technique, it can be further assumed that $q(a_i, b_i | T_i)$ and $q(A_i)$ are delta functions. Thus, the resulting update rules can be expressed as follows:

$$q(T_i) \propto \tilde{h}_i(T_i) \sum_{T_j | j \in N_i} \prod_{j \in N_i} q(T_j) g_{i,j}(T_i, T_j, \tilde{A}_i), \qquad (10)$$

$$\tilde{h}_i(T_i) = \arg\max_{a,b} h_i(T_i, a, b),$$

$$\tilde{A}_i = \arg\max_{A_i} \sum_{T_i} q(T_i) \sum_{T_j | j \in N_i} \prod_{j \in N_i} q(T_j) g_{i,j}(T_i, T_j, \tilde{A}_i).$$

Unlike previous approaches to epitome models, it should be appreciated that the update rules given in Equation (10) do not update the belief $q(T_i)$ about where each patch $S_i$ should map only according to the epitome likelihoods for different possible patches $T_i$. Instead, the update rules given in Equation (10) take into account the probable mappings of the patches in $N_i$ to skew the inference so as to have these patches in the proper geometric configuration with $T_i$. By using the best matching contrast parameters a and b, the inference can also be somewhat invariant to illumination changes. Additionally, $\tilde{A}_i$ can capture shearing of the image as it affects patch $S_i$. Depending on the strength of the links defined by $\Phi_k$, this shearing may be only local or more global. In one example, the strength of the links defined by $\Phi_k$ can be increased by adding an update equation to the update rules specified in Equation (10) to account for uncertainties in the correlation links as follows:

$$\Phi_k = \frac{\sum_{i,j|j \in N_i} \sum_{T_i} \sum_{T_j} q(T_i) q(T_j) D_{ij}^2}{\sum_{i,j|j \in N_i} 1}, \quad (11)$$

where $D_{ij} = T_i - T_j - A_i(\overline{S}_i - \overline{S}_j)$.

Additionally and/or alternatively, the transformation $A_i$ can be a diagonal transformation with diagonal elements $A_{i_m}$. For such a transformation, an additional update equation can be expressed as follows:

$$\tilde{A}_{i_m} = \frac{\sum_{j \in N_i} \sum_{T_i} \sum_{T_j} q(T_i) q(T_j)(\overline{T}_{i_m} - \overline{T}_{j_m})(\overline{S}_{i_m} - \overline{S}_{j_m})}{\sum_{j \in N_i} (\overline{S}_{i_m} - \overline{S}_{j_m})^2}. \quad (12)$$

In the examples disclosed herein, it should be noted that the epitome e that is used in the computation of $h_i$ can either be learned or preset. For example, the epitome e can be created by simply using an example of a video that sufficiently epitomizes the class of data of interest. The mean of the epitome e can then be defined to be equal to that video, and the variance of the epitome can be assigned a small uniform value. By doing so, the inference rules given above can be iterated to map other videos to the epitome. In another example, the epitome can also be learned from data by changing the original update rules as provided by Equation (5) to slightly to account for the contrast variables. More specifically, learning under the contrast model requires a reversal of the scaling and addition used during matching as follows:

$$\mu_u = \frac{\sum_i \sum_T q(T_i = T) \sum_k [u = T(k)](z_{S_i(k)} - b_i)/a_i}{\sum_i \sum_T q(T_i = T) \sum_k [u = T(k)]}. \quad (13)$$

As in the previous examples, the epitome update can then be iterated via the inference equations provided above.

4. Interpolating Missing Data

In various embodiments discussed above, a selection of data patches is modeled based at least in part on the factor graph 400. In accordance with an additional and/or alternative embodiment, a model of individual data elements can be constructed. Such a model can be used, for example, in an application utilizing images where a model of individual pixels is required. To create a model of individual pixels, data patches are obtained from an input image (e.g., by a patching component 10) and long-range correlations are determined between the data patches (e.g., by a correlation component 20). Finally, a model of the individual pixels are created by modifying the agreement factors illustrated in the graph 400 to resolve the fact that each pixel can belong to several data patches.

In one example, the agreement factors are modified by assuming that the patches $z_S$ belong to a hidden image. Further, it is assumed that each pixel of the observed image contains the average of all appropriate pixels in all patches $z_S$ that overlap the pixel. In this example, patch agreements are enforced in the inference distribution rather than in the model. Thus, an additional factor $f_u$ for each pixel $x_u$ of the observed image x can be added to the existing agreement factors g and h as illustrated in graph 400 as follows:

$$f_u = N\left(x_u; \frac{\sum_i \sum_k [u = S_i(k)] z_{S_i(k)}}{\sum_i \sum_k [u = S_i(k)]}, \rho_u^2\right), \quad (14)$$

with the total image likelihood proportional to:

$$p(x) \propto \left(\prod_u f_u\right)\left(\prod_i h_i \prod_j g_{i,j}\right). \quad (15)$$

In one example, the variational posterior can be factorized as $Q = \Pi_u q(z_u) \Pi_i q(A_i) q(a_i, b_i|T_i) q(T_i)$ with a single part of the posterior $q(z_u) = \delta(z_u - v_u)$ for each particular pixel $z_u$ in the hidden image, regardless of how many patches $z_{S_i}$ the pixel may be in. Thus, the agreement of patches can be enforced wherever patches overlap in the posterior distribution over all hidden variables. Additionally, the posterior and the model parameters are estimated by minimizing the free energy as follows:

$$F = \sum_{hiddens} Q \log \frac{\left(\prod_u f_u\right)\left(\prod_i h_i \prod_j g_{i,j}\right)}{Q}. \quad (16)$$

Thus, one example of the present invention provides for a model that describes the likelihood of image pixels rather than patches while still capturing a number of pixel correlations. In accordance with one aspect of the present invention, this model can also make possible the inference of hidden pixels $z_u$ via the application of various conventional algorithms. By way of non-limiting examples, these algorithms include denoising and superresolution, which are achieved by setting some of the variances $\rho_u^2$ to large values. However, unlike conventional applications of these algorithms, the inference procedure utilized by various embodiments disclosed herein involves enforcing long-range correlations in the image. It should be noted that while long-range correlations can be used to improve previous applications of patch models, they can also be used to achieve tasks that require accounting for long-range correlations in data, which is not possible in previous applications of patch models.

In one example, inference of the hidden image pixels $z_u$ reduces to estimation of parameters $v_u$ as follows:

$$v_u = \frac{\frac{x_u}{\rho_u^2} + \sum_{i,k|S_i(k)=u} q(T_i)\frac{\mu_{T_i(k)}}{\sigma_{T_i(k)}^2}}{\frac{1}{\rho_u^2} + \sum_{i,k|S_i(k)=u} q(T_i)\frac{1}{\sigma_{T_i(k)}^2}},$$ (17)

which balances the votes from different epitome patches with the observed value for the pixel based on the ratio of appropriate noise or uncertainty parameters (e.g. variances $\sigma^2$ for votes from epitome patches and $\rho^2$ for the votes from the observed image), as well as the uncertainties about mapping (e.g., $q(T_i)$). In this example, the other update rules as expressed in Equation (10) remain the same, except that patches of variational hidden image means $v_{s_i}$ are used instead of patches $z_{s_i}$ to compute $h_i$.

In testing the embodiments disclosed herein, a number of experiments were performed for obtaining plausible guesses for large chunks of missing data by setting variances $\rho_u^2$ for the missing data to high values. As an example, a video sequence simulating a walk through a hallway can created from a still image of the hallway and a video sequence depicting a walk through another hallway. As another example, the procedures disclosed above can be utilized to perform photograph relighting given a photograph and a video sequence depicting illumination changes. Due to complex long-range correlations in these two types of data, inference of missing data using traditional patch quilting would be impossible.

Figure 5:
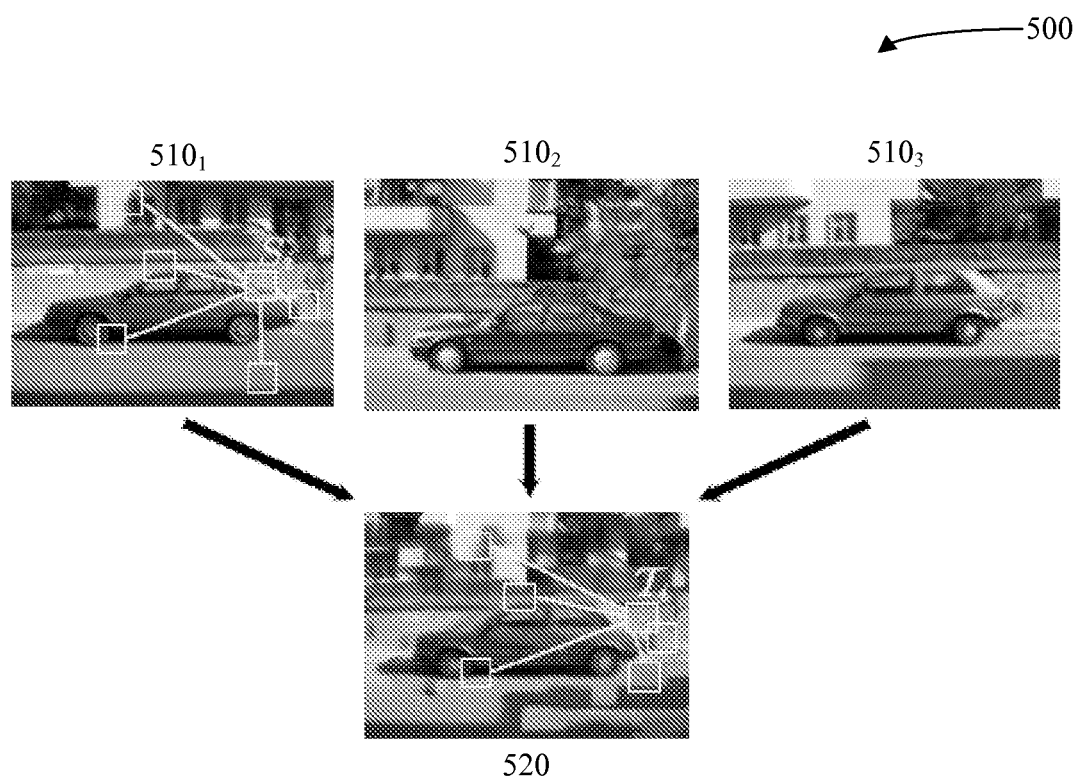
FIG. 5 is a diagram illustrating the creation of a patch model from a set of image data in accordance with an aspect of the present invention.

Referring now to FIG. 5, a diagram 500 illustrating the creation of a patch model 520 from a set of image data 510 in accordance with an aspect of the present invention is provided. The diagram 500 illustrates a patch model 520 in the form of an epitome model of three car images 510 that was learned by an embodiment disclosed herein using long-range patch correlations. Specifically, patches of size 6×6 from the car images 510 were used to learn the 128×96 epitome model 520, which after learning looks like a prototypical car. In experimentation, the mean of the three images 510 was used to initialize the epitome model 520. One or more algorithms in accordance with various embodiments disclosed herein were then employed to refine the epitome model 520 from the images 510, wherein no alignment of the images 510 was done manually beforehand. After learning, it can be seen that the resulting epitome model 520 is a morph of the three images 510.

In one example, the patch indicated by $S_i$ in the top-left image $510_1$ is connected to several other randomly chosen patches in the image such that their corresponding mappings to a location $T_i$ within the epitome model 520 keep a similar spatial configuration. Exemplary patch correlation links are illustrated in the top-left image $510_1$. Thus, when the patch $S_i$ in the top-left image $510_1$ is matched to a corresponding patch $T_i$ in the epitome model 520, the distances between the patch $S_i$ and its randomly chosen connected patches are generally maintained. Further, this matching can be constrained by the matches for the patches connected to $S_i$.

In essence, the long-range patch correlations utilized in the example illustrated by the diagram 500 caused the patches from the three images 510 to agree upon an alignment of their features. Thus, the epitome model 520 reflects this alignment of features. For example, it is commonly known and can be seen from the images 510 that where one wheel can be observed from the side of a car, another wheel is likely to be found somewhere horizontally away from the observed wheel. Likewise, in one example of the present invention, the epitome model 520 can recognize that if a patch for a wheel is present in an image of a side view of a car, another patch for a wheel is likely to be found horizontal to that patch. Thus, if given many images of a particular category, such as the car images 510, the epitome model 520 should learn that there are patches that appear in all of the images and that those patches appear in certain spatial configurations.

Figure 6:
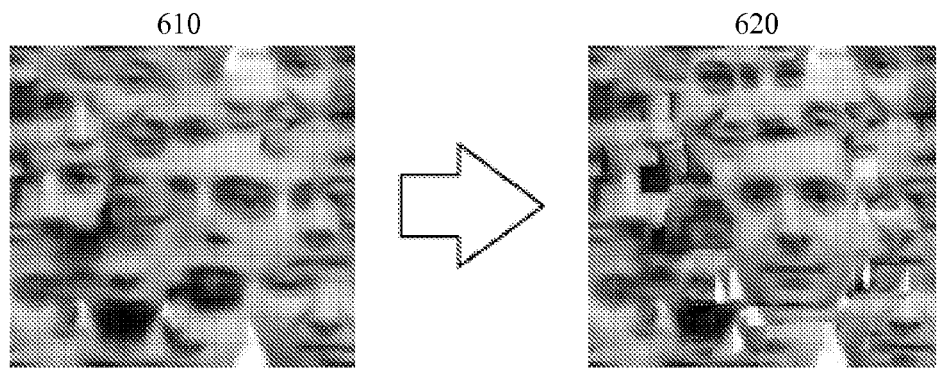
FIG. 6 illustrates a comparison between a patch model that does not utilize long-range patch correlations and a patch model that does utilize long-range patch correlations in accordance with an aspect of the present invention.

Turning to FIG. 6, a comparison between a patch model 610 that does not utilize long-range patch correlations and a patch model 620 that does utilize long-range patch correlations in accordance with an aspect of the present invention is illustrated. In conventional patch models, a variety of patch sizes could be used during learning. Larger patches used with conventional patch models can capture large features. However, because larger image structures also undergo larger deformations, a significant amount of blurring is introduced to the model. On the other hand, smaller patches used with conventional patch models can capture repeating details that are easier to register. However, patch models utilizing smaller patches tend to have smaller structures and more discontinuities. In contrast, when learning a patch model with long-range patch correlations in accordance with various embodiments disclosed herein, large image structures can be captured using smaller patches, thus allowing for sharper epitomes and higher epitome likelihoods. These larger structures in the patch model are a result of a combination of the global correlations provided by the mapping field used in accordance with various embodiments disclosed herein and the local correlations provided simply by patch overlaps as in conventional patch models.

As an example, without long-range patch correlations, the model of a database of faces looks like patch model 610. By learning over a predetermined number of iterations and taking into account long-range patch correlations by iterating Equations (10) and (13) to infer the patch mappings to the model, the resulting patch model 620 can begin to include larger image structures. Further, it can be seen that the patch model 620 includes a prototypical sharp whole face, to which many images may be mapped. Because of the learning algorithms utilized by the patch model 620, the prototypical face may not look like any one single face in the database. Thus, while patch model 610 can model local intensities very well, it is unable to detect irregularities to an entire face. By utilizing long-range patch correlations, patch model 620 can learn not only the individual patches but what constitutes a typical face. Based on this overall context, patch model 620 can detect irregularities to an entire face where patch model 610 could not.

Figure 7:
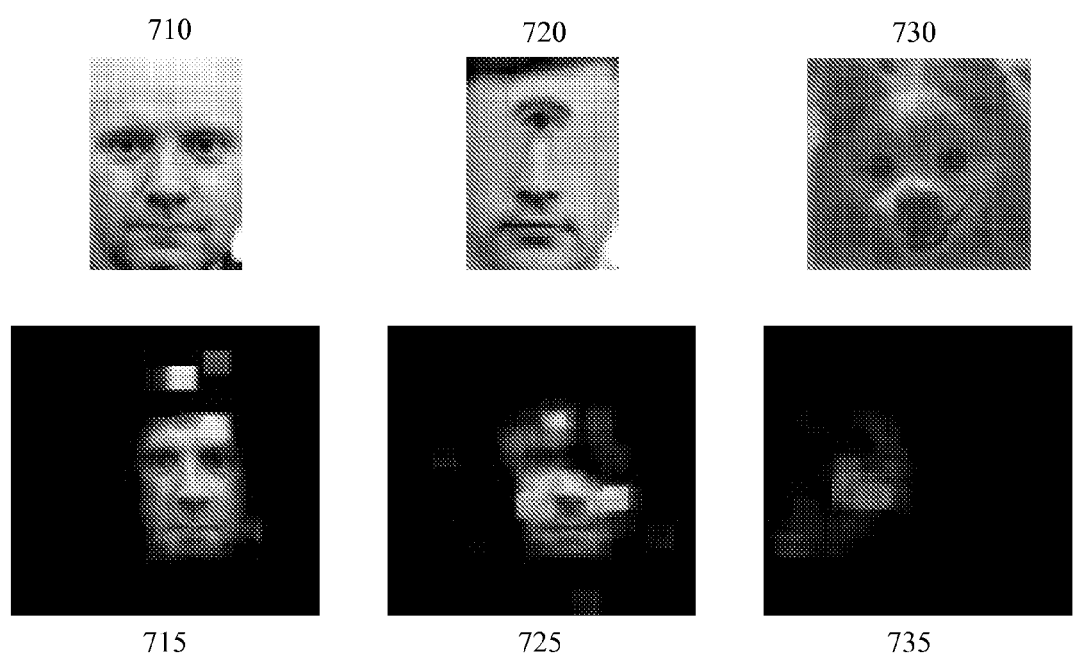
FIG. 7 illustrates exemplary image recognition data in accordance with an aspect of the present invention.

Referring to FIG. 7, exemplary image recognition data in accordance with an aspect of the present invention is illustrated. Three images (710, 720, and 730) of potential human faces are shown along the top of the figure with the corresponding matched areas of a patch model (715, 725, and 735, respectively) below each image. The patch models 715, 725, and 735 are illuminated proportional to how well the patches in the respective images 710, 720, and 730 match to areas in the patch model. The illuminated patch models 715, 725, and 735 can be created by, for example, an image recognition component 40. Further, in accordance with an aspect of the present invention, the patch models 715, 725, and 735 can be created and/or illuminated using long-term patch correlations obtained from the images 710, 720, and 730.

In experimentation, it is expected that with long-term patch correlation constraints, patches of a human face should match to contiguous areas of a patch model, as opposed to patches scattered all around the patch model. Likewise, when a non-human face is matched with the patch model, it is expected that correlation constraints would be violated and that patches would not match to the model in the same manner as would a human face. To show where patches in an image match in a corresponding patch model, the denominator in Equation (5) can be used as a transparency mask on the patch model.

It can be observed from FIG. 7 that the human face image 710 causes a large contiguous area of the patch model 715 to be used frequently. Additionally, the large forehead of the subject of image 710 also results in the high use of a bright patch above the main face area of the model 715. The middle image 720 has been manipulated to portray a "Cyclops," i.e., a human face with only one eye. It can be seen that the bottom half of the prototypical face in the model 725 is normal, but only one side of the upper half of the face is illuminated. Without modeling long-range correlations in patch model mappings, both eyes would be used by the model 725 with equal probability. However, because of these modeling constraints, only half of the face in the model 725 is substantially used. Finally, an image of a dog 730 is provided. As the image of the dog 730 does not resemble a human face, it can be observed that the patch usage area in the model 735 is quite deviant from that of a human face. Thus, classification can be performed on the images 710, 720, and 730 (e.g., by an image recognition component 40) by computing the likelihood under the respective model for each of the images.

Figure 8:
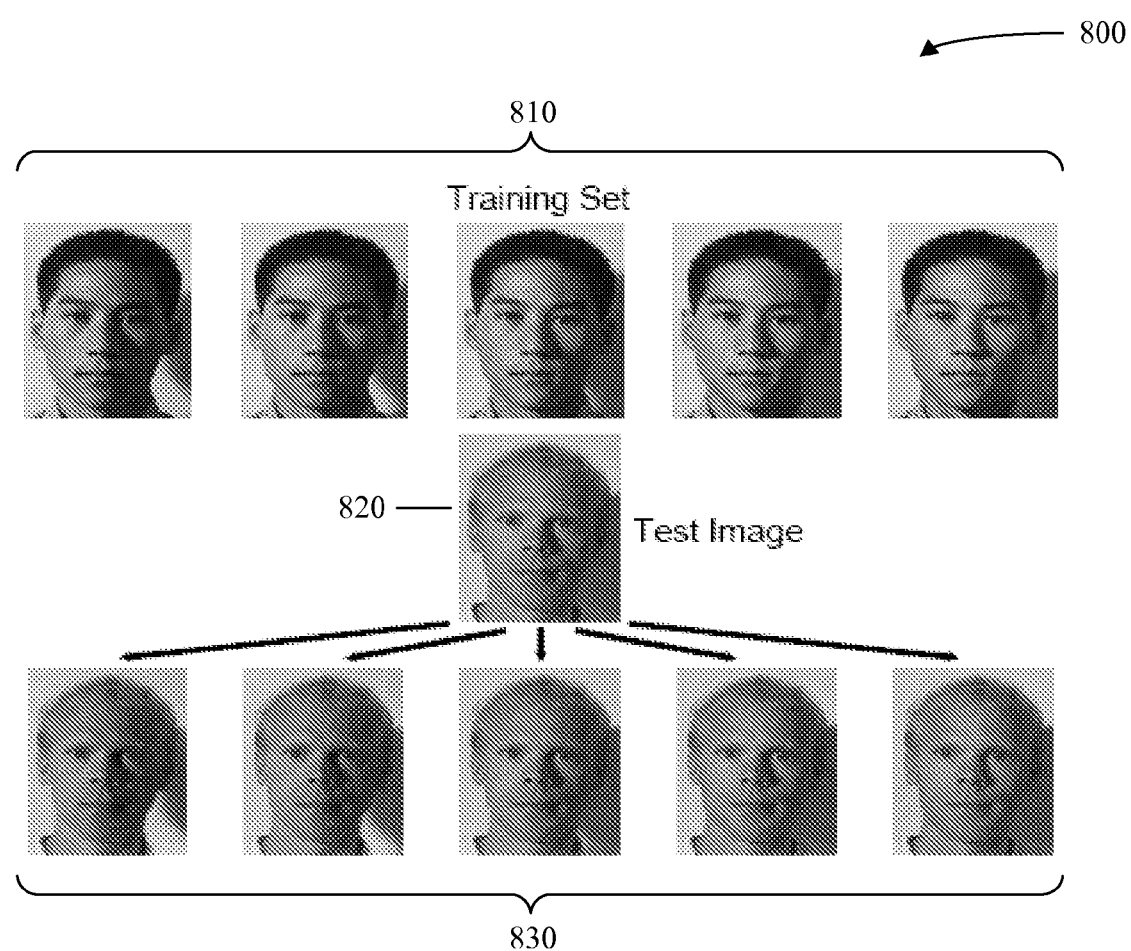
FIGS. 8-11 illustrate exemplary data transformations performed in accordance with various aspects of the present invention.

Turning now to FIG. 8, an exemplary data transformation 800 performed in accordance with various aspects of the present invention is illustrated. Specifically, given a training set 810 consisting of a video sequence of a face exhibiting changes in illumination and a test image 820 of a different face, the test image 820 can be extrapolated to generate a synthesized video sequence 830 that reflects the illumination changes present in the training set 810. Often, it is desired to change the illumination of a subject in order to have the subject blend properly with other elements in the scene. Accordingly, information from a training sequence such as training set 810 can be leveraged and used to interpolate changes in illumination of an image. It should be appreciated that the synthesized video sequence 830 is plausible despite the absence of any geometry or domain knowledge. Additionally, not only do the sharp shadows on the face move as would be expected, but the projected shadow behind the head also moves in a plausible manner.

In one example, this transformation on the test image 820 can be performed by synthesizing the training set 810 with the test image 820 via a synthesis component 50. Additionally and/or alternatively, the transformation can be performed by iterating Equations (10), (12), (11), (13), and (17). In another example, the illumination changes are transferred onto the test image 820 through patch matching between the test image 820 and the training video sequence 810 and transferral of the change that the patch exhibits in the training sequence 810 in the adjacent frames. The result can then grow outwards in an iterative fashion. More specifically, a patch model used in the transformation 800 can utilize three-dimensional patches, having a volume in spatial dimensions x and y and time dimension t. Thus, for each patch in the three-dimensional volume, the model can learn what patches must be used at particular points in the volume and how using one patch at a certain space and time limits the patches that can be used at another space and time in the volume. Thus, correlations can be expressed for elements of the training sequence 810 such as shadows. For example, a model can learn that if one part of the face in the training sequence 810 gets darker, there will be a shadow cast behind the face onto the wall, thus making the wall darker, and that the other side of the face will likely become lighter because the light source is moving.

Further, it should be appreciated that because the transformation 800 involves extrapolation from a single image, it is difficult, especially in frames far from the original seed, to maintain the coherence of the patch matching. Thus, it should be appreciated that using long-range correlations between the patches is essential in maintaining consistency in the results of the transformation 800. In the non-limiting example of transformation 800, patches of size 10 pixels×10 pixels×5 frames were used with 30 correlation links.

Figure 9:
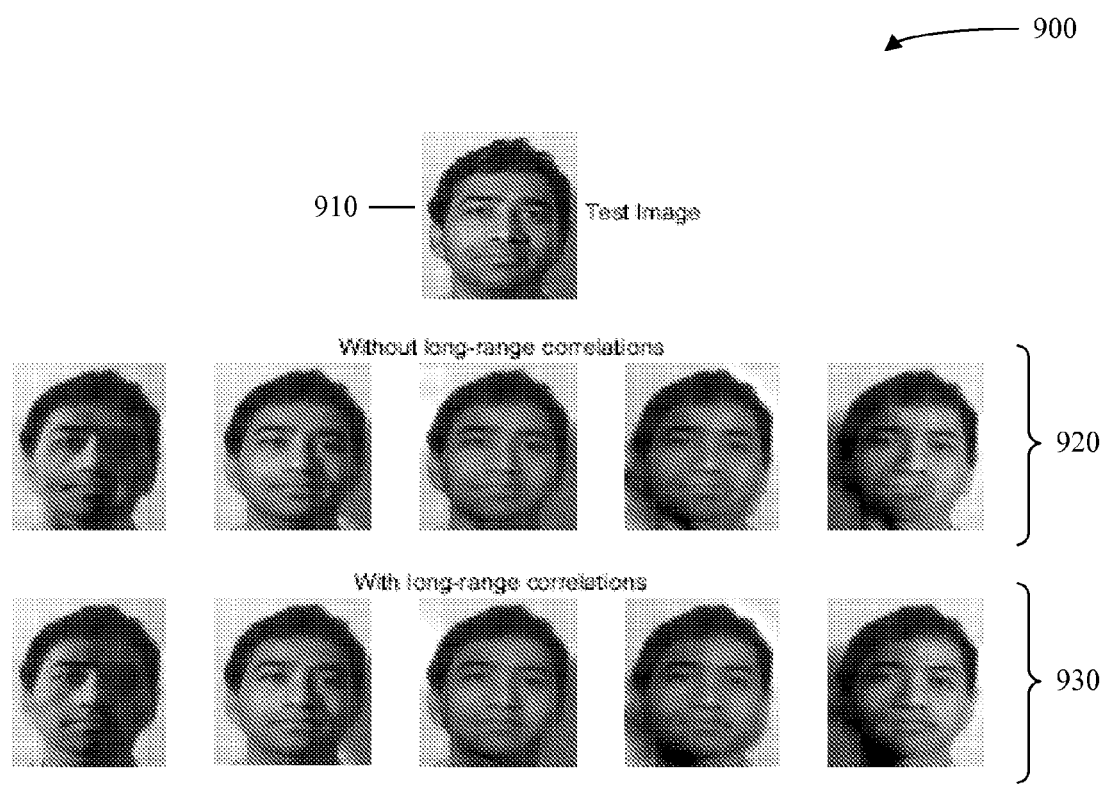

Turning now to FIG. 9, another exemplary data transformation 900 performed in accordance with various aspects of the present invention is illustrated. Specifically, a still test image 910 is synthesized with a training sequence of a different face exhibiting changes in illumination (not shown but similar to 810) to generate a synthesized video sequence exhibiting similar changes in illumination. Synthesized sequence 920 shows the results of such a synthesis without the use of long-range patch correlations, while synthesized sequence 930 shows the results of the same synthesis with the use of long-range patch correlations. It can be seen that the results obtained from the first synthesized sequence 920 without long-range patch correlations are much less plausible than that results obtained from the second synthesized sequence 930 that does utilize long-range patch correlations. This further serves to demonstrate the need for long-range correlations.

Figure 10:
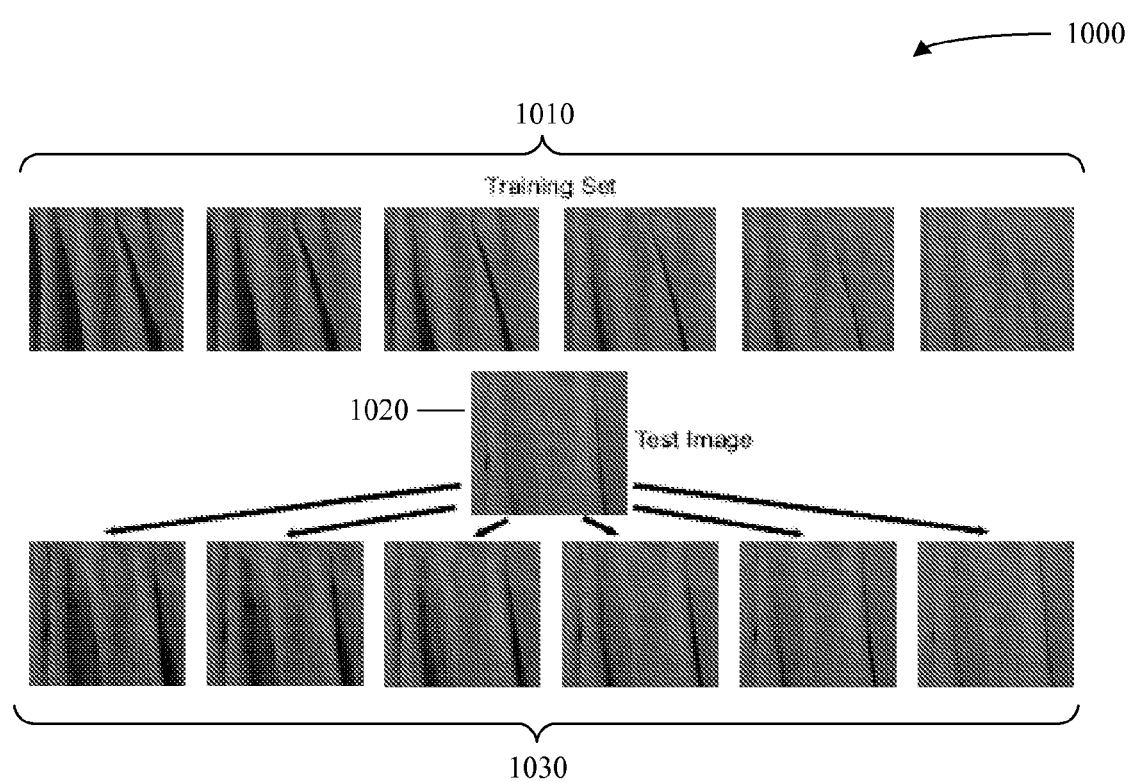

Referring briefly to FIG. 10, another exemplary data transformation 1000 performed in accordance with various aspects of the present invention is illustrated. Specifically, given a training sequence 1010 of a rippled piece of cloth exhibiting changes in illumination and a test image 1020 of a different piece of cloth, the test image 1020 can be extrapolated to synthesized sequence 1030 that reflects the illumination changes present in the training set 1010. Because the geometry of folded cloth is very complex, it would be difficult to model in order to utilize conventional image illumination applications. Despite the complexity of cloth, however, it can be observed from the synthesized sequence 1030 that the illumination and shadows of the cloth change in a plausible manner. In the non-limiting example of transformation 1000, patches of size 15 pixels×15 pixels×5 frames were used with 50 correlation links.

Figure 11:
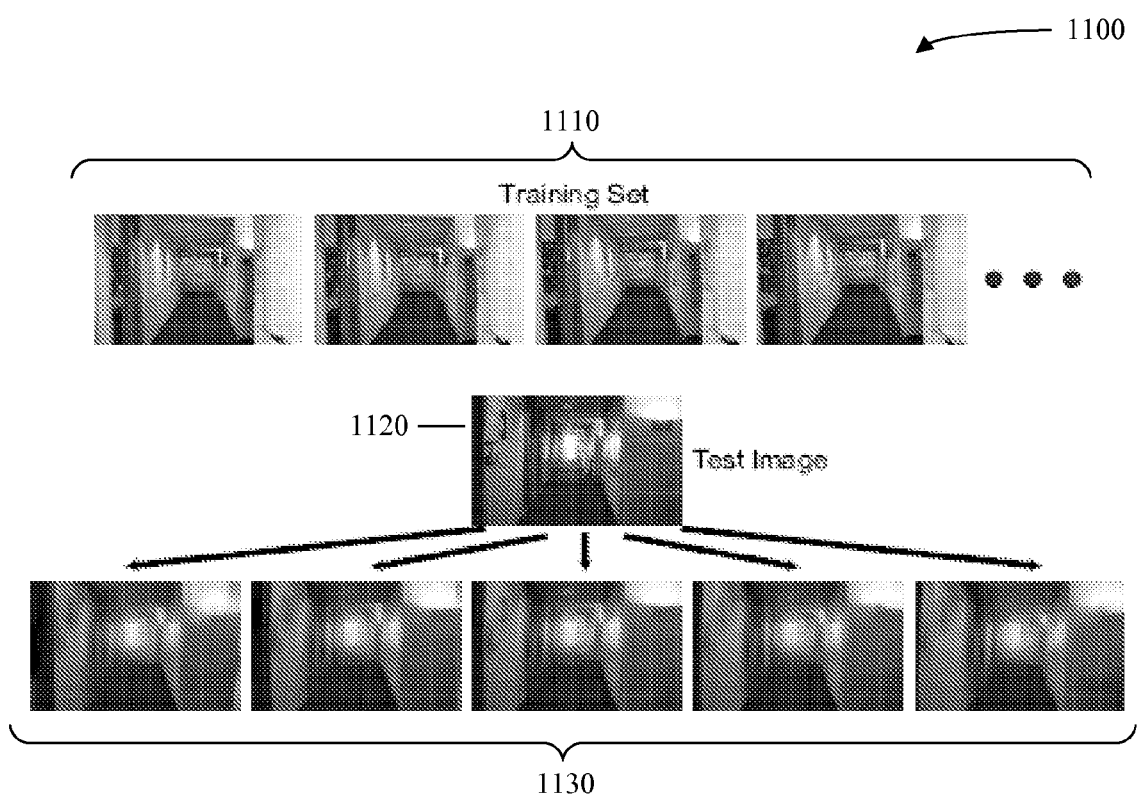

Turning now to FIG. 11, yet another exemplary data transformation 1100 performed in accordance with various aspects of the present invention is illustrated. Specifically, given a training sequence 1110 of a walk through a hallway and a still test image 1120 of a different hallway, the test image 1120 can be extrapolated to generate a synthesized sequence 1030 that simulates walking through the hallway depicted in the test image 1120. It should be noted that the test image 1120 is not simply enlarged, as parallax effects are apparent. As with the previous transformations illustrated in FIGS. 8-10, no knowledge of geometry or domain knowledge is required by the algorithm as the patch correlations are sufficient to generate a plausible synthesis.

In an experiment relative to transformation 1100, a set of data x given by a still image of a hallway (e.g., test image 1120) was assumed to be a video of a hallway walkthrough (i.e., a video sequence of a hallway with motion due to the cameraman walking through the hallway) where only a single frame was given. For this experiment, the coordinates u=(x, y,t) were defined as three-dimensional, the patches $S_i$ were defined as video cubes of a certain size, and the variances $\rho_{x,y,t}^2$ were set to a high value everywhere except when t=0. At t=0, the variance was set to a small value to overpower epitome model predictions. An epitome model e was defined with a single sequence of a walk through another hallway (e.g., training sequence 1110) set to its mean and its variances set to a uniform small value. Next, Equations (10) and (17) were iteratively applied until convergence. After each application of these equations, it was noted that the inferred video v resembled the original video used as an epitome (e.g., training sequence 1110) more and more, both in terms of the local video texture resulting from quilting patches $e_T$ and in terms of how the quilting of such patches in one part of the video volume influenced the choice of the patches in another, distant, part of the volume. Thus, the resulting sequence $v_{x,y,t}$ (e.g., synthesized sequence 1130) contained the given photograph as its frame 0, since the low variances $\rho_{x,y,t=0}^2$ require it. However, from t=−7 to t=7, new frames were added that agree with frame 0. The resulting sequence contains the motion of the hall's walls out of the field of view, the zooming motion of the texture close to the center of the field of view, and the same rocking motion of the human walk present in the epitomic example.

Figure 12:
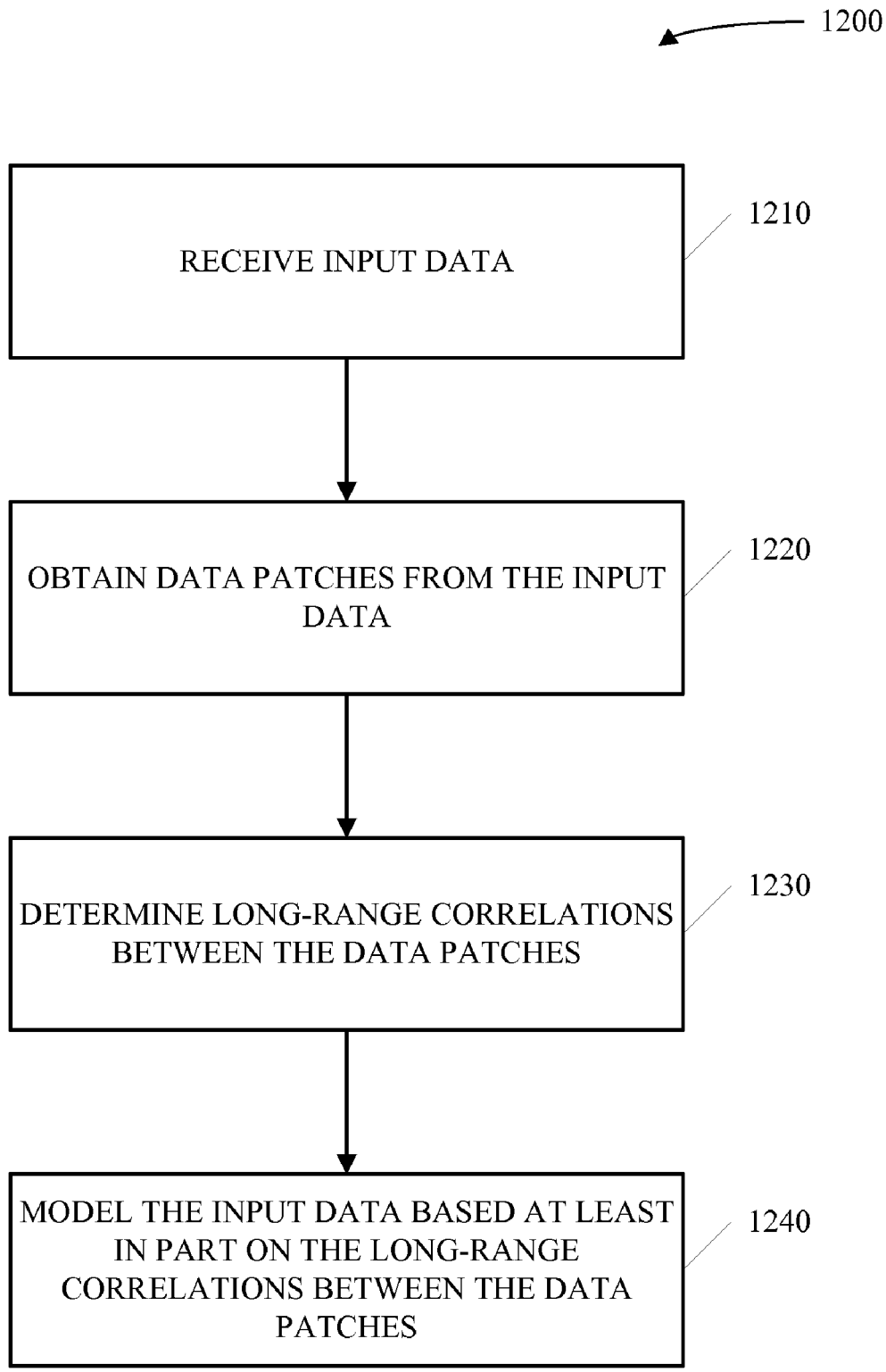
FIG. 12 is a flowchart of a method of modeling data in accordance with an aspect of the present invention.
Figure 13:
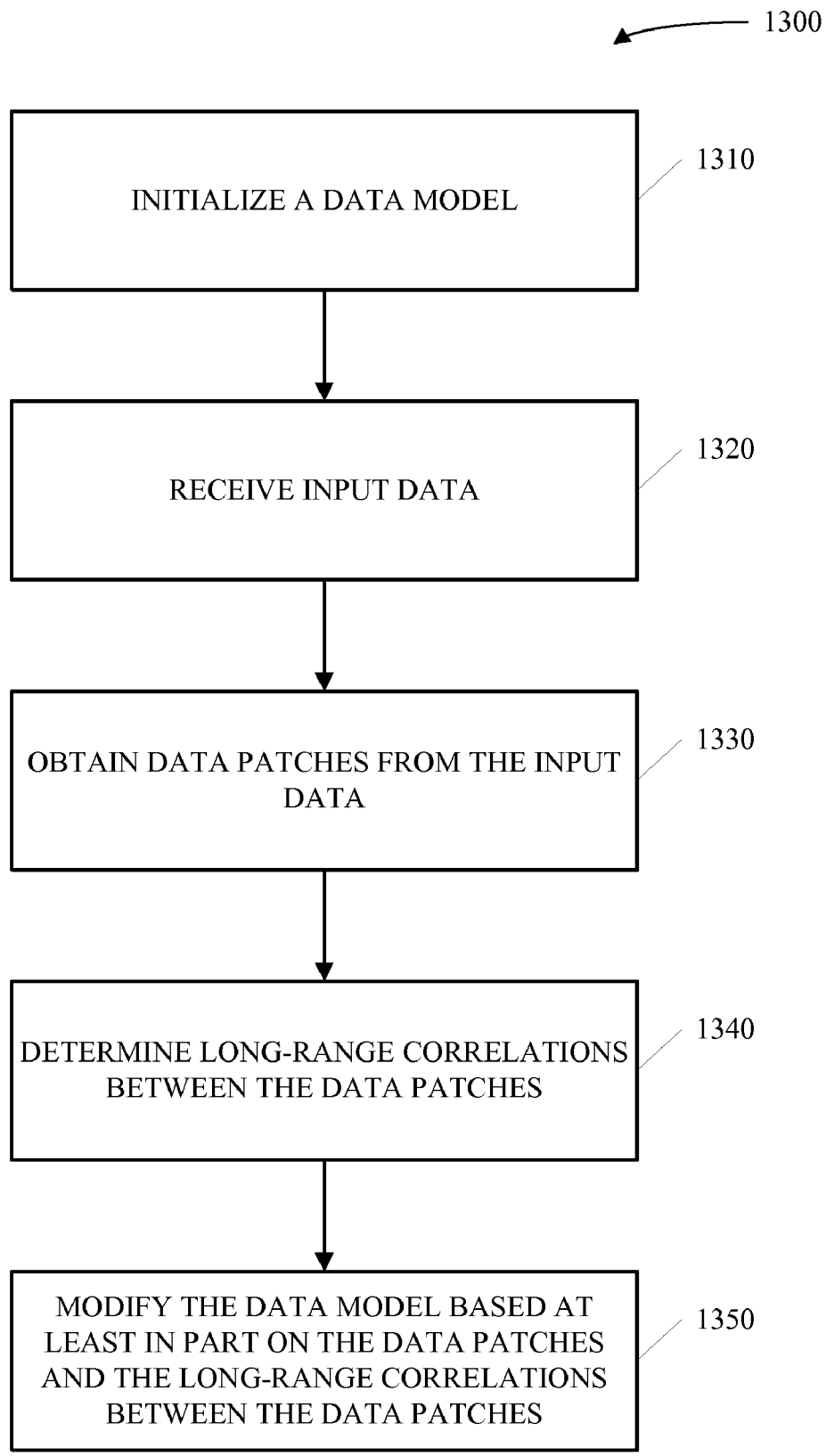
FIG. 13 is a flowchart of a method of modeling data in accordance with an aspect of the present invention.
Figure 14:
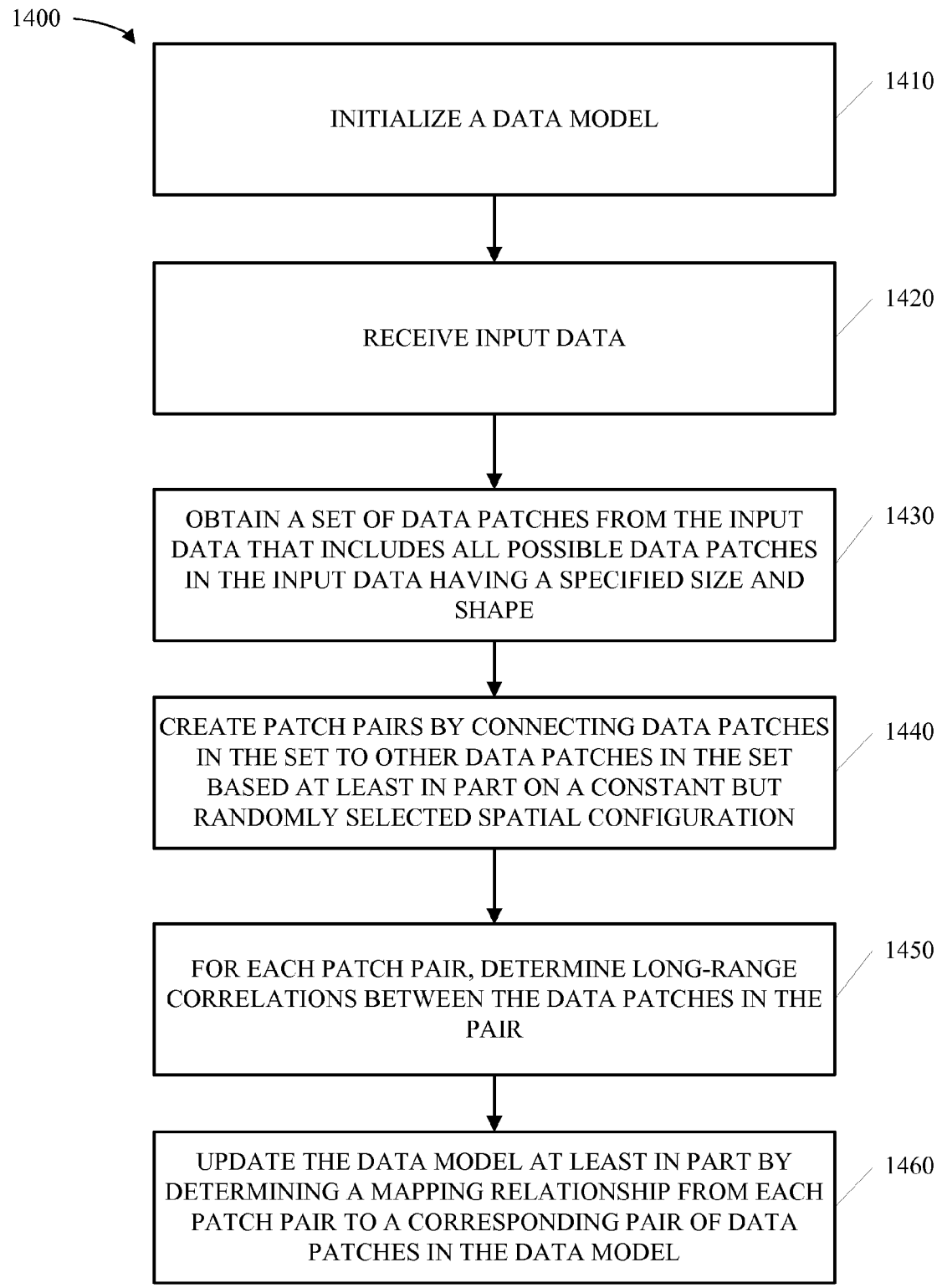
FIG. 14 is a flowchart of a method of modeling data in accordance with an aspect of the present invention.

Turning to FIGS. 12-14, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various embodiments. As will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers, etc.). Such components can automate certain mechanisms or processes performed thereby to make portions of the systems and methods more adaptive as well as efficient and intelligent.

Referring to FIG. 12, a flowchart of a method 1200 of modeling data in accordance with an aspect of the present invention is illustrated. At 1210, input data (e.g., input data 101) is received. At 1220, data patches are obtained from the input data (e.g., by a patching component 10). At 1230, long-range correlations are determined between the data patches (e.g., by a correlation component 30). At 1240, the input data is modeled based at least in part on the long-range correlations between the data patches (e.g., by a modeling component 30).

Referring now to FIG. 13, a flowchart of a method 1300 of modeling data in accordance with an aspect of the present invention is illustrated. At 1310, a data model (e.g., data model 35) is initialized. At 1320, input data is received. At 1330, data patches are obtained from the input data. At 1340, long-range correlations are determined between the data patches. At 1350, the data model is modified (e.g., by a modeling component 30) based at least in part on the data patches and the long-range correlations between the data patches.

Turning to FIG. 14, a flowchart of a method 1400 of modeling data in accordance with an aspect of the present invention is illustrated. At 1410, a data model is initialized. At 1420, input data is received. At 1430, a set of data patches is obtained from the input data that includes all possible data patches in the input data having a specified size and shape. At 1440, patch pairs are created by connecting data patches in the set created at step 1430 to other patches in the set created at step 1430 based at least in part on a constant but randomly selected spatial configuration. At 1450, for each pair of patches created at step 1440, long-range correlations between the patches of the patch pair are determined. At 1460, the data model is updated at least in part by determining a mapping relationship from each patch pair to a corresponding pair of data patches in the data model (e.g., by using factor graph 400).

Figure 15:
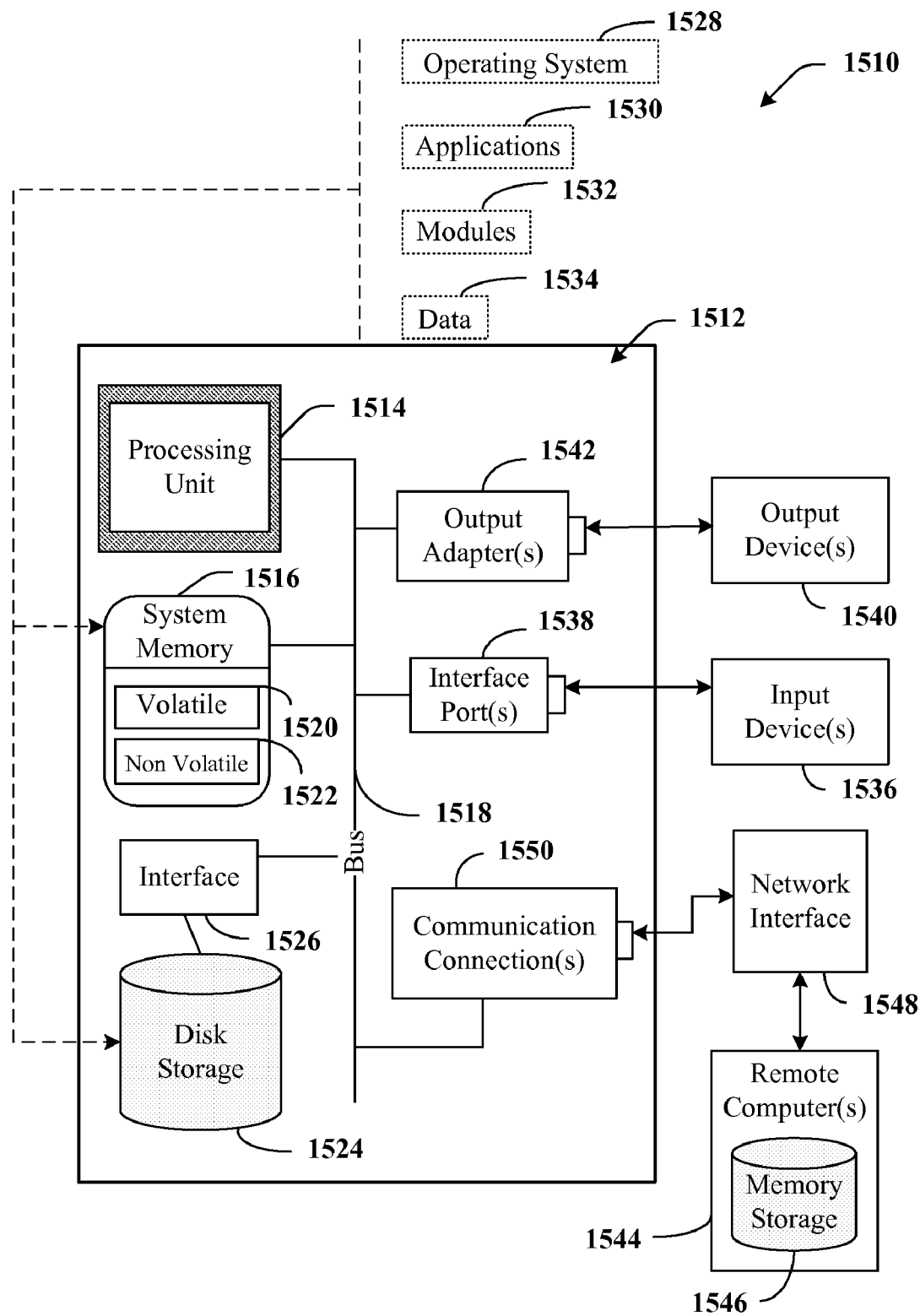
FIG. 15 is a diagram of an exemplary computing environment in which various embodiments disclosed herein may function.

In order to provide additional context for various aspects of the present invention, FIG. 15 and the following discussion are intended to provide a brief, general description of a suitable operating environment 1510 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc., that perform particular tasks or implement particular data types. The operating environment 1510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example, disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512 and to provide output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Furthermore, the aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

What is claimed is:

1. A system for modeling data, comprising:
   one or more processors;
   a memory that includes a plurality of computer-executable components, the plurality of computer-executable component comprising:

a patching component that creates data patches from input data;

a correlation component that obtains long-range correlations between the data patches created by the patching component;

a modeling component that creates a patch model of the input data based at least in part on the data patches created by the patching component and the long-range correlations obtained by the correlation component; and a synthesis component that performs a transformation on a set of test data by synthesizing the patch model with the test data to generate transformed data.

2. The system of claim 1, wherein the input data correspond to at least one image and the patch model comprises representation of a category of images.

3. The system of claim 2, wherein the patch model is an epitome model.

4. The system of claim 2, further comprising an image recognition component that receives a test image and employs at least the patch model to determine the extent to which the test image matches the category of images represented by the patch model.

5. The system of claim 1, wherein the modeling component further determines a mapping relationship from a pair of data patches created from the input data to a corresponding pair of data patches in the patch model.

6. The system of claim 1, wherein the set of test data includes an image of a scene, the patch model includes a representation of one or more video sequences illustrating motion through a similar scene, and the synthesis component performs a transformation that includes the creation of a simulated video sequence illustrating the motion represented by the patch model through the scene depicted by the test data.

7. The system of claim 1, wherein the set of test data is an image, the patch model represents one or more video sequences, and the synthesis component performs a transformation on the set of test data at least in part by handling the set of test data as a given frame of an otherwise missing video sequence, creating a model of individual pixels represented by the patch model, and interpolating missing frames of the video sequence corresponding to the test data based at least in part on the model of individual pixels.

8. The system of claim 7, wherein the pixels of each missing frame of the video sequence corresponding to the test data are inferred by estimating the parameters $v_u$ in the following equation:

$$v_u = \frac{\frac{x_u}{\rho_u^2} + \sum_{i,k|S_i(k)=u} q(T_i)\frac{\mu_{T_i(k)}}{\sigma_{T_i(k)}^2}}{\frac{1}{\rho_u^2} + \sum_{i,k|S_i(k)=u} q(T_i)\frac{1}{\sigma_{T_i(k)}^2}},$$

where u is a two-dimensional set of pixel coordinates, $x_u$ is a pixel of an observed image, $S_i$ is a subset of patches in the video sequence corresponding to the test data, $T_i$ is a subset of patches in the patch model, k is a patch index, $\mu_{T_i(k)}$, $\sigma_{T_i(k)}^2$, and $\rho_u^2$ are noise and uncertainty parameters, and $q(T_i)$ represents mapping uncertainty.

9. A method of modeling data, comprising:

receiving input data;

creating data patches from the input data;

selecting pairs of the data patches that are created from the input data;

obtaining long-range correlations between the pairs of data patches, each long-range correlation being obtained for corresponding data patches in a respective pair of data patches; and modeling the input data based at least in part on the data patches and the long-range correlations by initializing a patch model and determining a mapping relationship from each pair of data patches to a corresponding pair of data patches in the patch model.

10. The method of claim 9, wherein the modeling includes initializing a patch model and modifying the patch model based at least in part on the data patches and the long-range correlations.

11. The method of claim 10, wherein modifying the patch model includes iterating the following update rules:

$$q(T_i) \propto \tilde{h}_i(T_i) \sum_{T_j|j \in N_i} \prod_{j \in N_i} q(T_j) g_{i,j}(T_i, T_j, \tilde{A}_i),$$

$$\tilde{h}_i(T_i) = \arg\max_{a,b} h_i(T_i, a, b),$$

$$\tilde{A}_i = \arg\max_{A_i} \sum_{T_i} q(T_i) \sum_{T_j|j \in N_i} \prod_{j \in N_i} q(T_j) g_{i,j}(T_i, T_j, \tilde{A}_i)$$

where $g_{i,j}$, $h_i$, and $\tilde{h}_i$ are agreement and likelihood factors for a mapping from each pair of data patches to a corresponding pair of data patches in the patch model, $\tilde{A}_i$ is a transformation that captures shearing as it affects a patch $S_i$, $T_i$ and $T_j$ are patches in the patch model, a and b are scalar hidden variables, $N_i$ represents the set of data patches j connected to a data patch i in the patch model, and $q(T_i)$ represents a belief about the patch $T_i$ in the patch model to which a patch $S_i$ should map.

12. The method of claim 9, wherein the selecting includes selecting pairs of rectangular data patches that are created from the input data.

13. The method of claim 9, wherein the selecting includes connecting a predetermined number of data patches in the input data to each data patch in the input data based at least in part on a uniform and randomly generated spatial configuration.

14. The method of claim 9, wherein the input data correspond to at least one image and the patch model comprises representation of a category of images.

15. The method of claim 9, wherein determining a mapping relationship is based at least in part on maximizing the following:

$$p(z_{S_1}, z_{S_2}, \ldots, z_{S_I}) \propto \prod_i h_i \prod_{j \in N_i} g_{i,j},$$

where z is a set of input data, $z_{S_1}$ through $z_{S_I}$ are patches in z, I is the total number of patches in z, $N_i$ represents the set of data patches j connected to a data patch i in the patch model, and $g_{i,j}$ and $h_i$ are agreement and likelihood factors for a mapping from each pair of data patches to a corresponding pair of data patches in the patch model.

16. The method of claim 15, wherein the factors $g_{i,j}$ are determined based at least in part on the following equation:

$$g_{i,j} = N(\overline{T}_i - \overline{T}_j; A_i(\overline{S}_i - \overline{S}_j), \Phi_{i,j}),$$

where $\bar{S}_i$ and $\bar{S}_j$ are the means of the coordinates of patches i and j obtained from the input data; $T_i$ and $T_j$ are the means of the coordinates of corresponding patches i and j in the patch model, $A_i$ is a hidden linear transformation of the coordinates of patches i and j obtained from the input data, and $\Phi_{i,j}$ is a covariance matrix; and the factors $h_i$ are determined based at least in part on the following equation:

$$h_i = e_{T_i}(a z_{s_i} + b_i),$$

where $z_{s_i}$ is a data patch created from the input data z, $e_{T_i}$ is a data patch in the data model, and a and b are scalar hidden variables.

17. A computer readable medium comprising computer executable instructions for performing the method of claim 9.

18. A system for modeling data, comprising:
   means for receiving input data;
   means for creating data patches from the input data;
   means for selecting pairs of the data patches by connecting a predetermined number of the data patches created from the input data to each data patch created from the input data based at least in part on a uniform and randomly generated spatial configuration;
   means for obtaining long-range correlations between the pairs of data patches, each long-range correlation being obtained for corresponding data patches in a respective pair of data patches; and
   means for modeling the input data based at least in part on the data patches and the long-range correlations.

19. The system of claim 18, wherein the means for modeling includes means for initializing a patch model and means for training the patch model.

20. The system of claim 19, further comprising means for employing the patch model to transform a set of test data.

* * * * *